F. CRAWFORD, Sr.
STOP MOTION.
APPLICATION FILED JAN. 22, 1919.

1,354,379.

Patented Sept. 28, 1920.
5 SHEETS—SHEET 1.

Inventor:
Frank Crawford Sr.
by his Attorneys,
Howson & Howson

F. CRAWFORD, Sr.
STOP MOTION.
APPLICATION FILED JAN. 22, 1919.
1,354,379.
Patented Sept. 28, 1920.
5 SHEETS—SHEET 2.
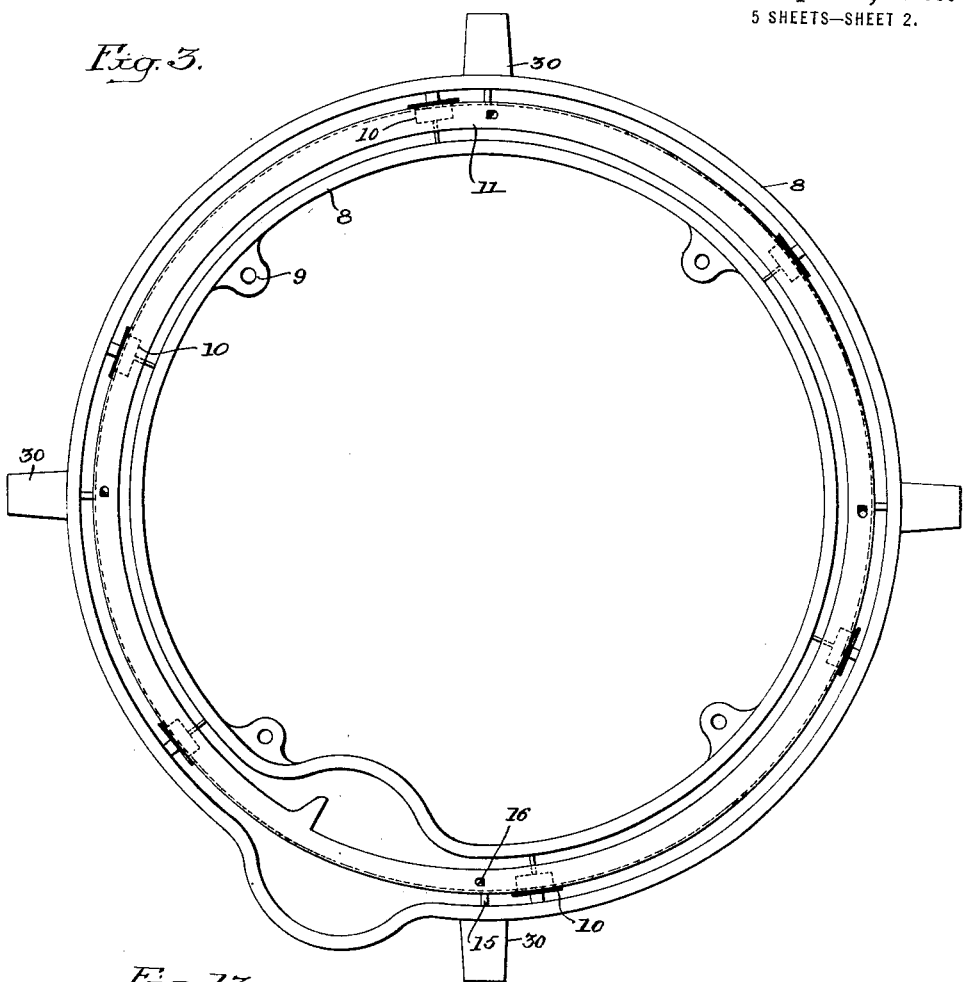
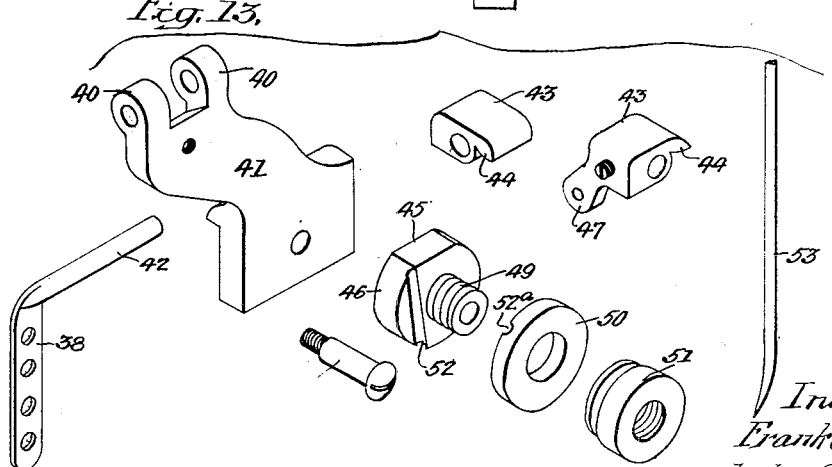
Inventor:
Frank Crawford Sr.
by his Attorneys
Howson & Howson

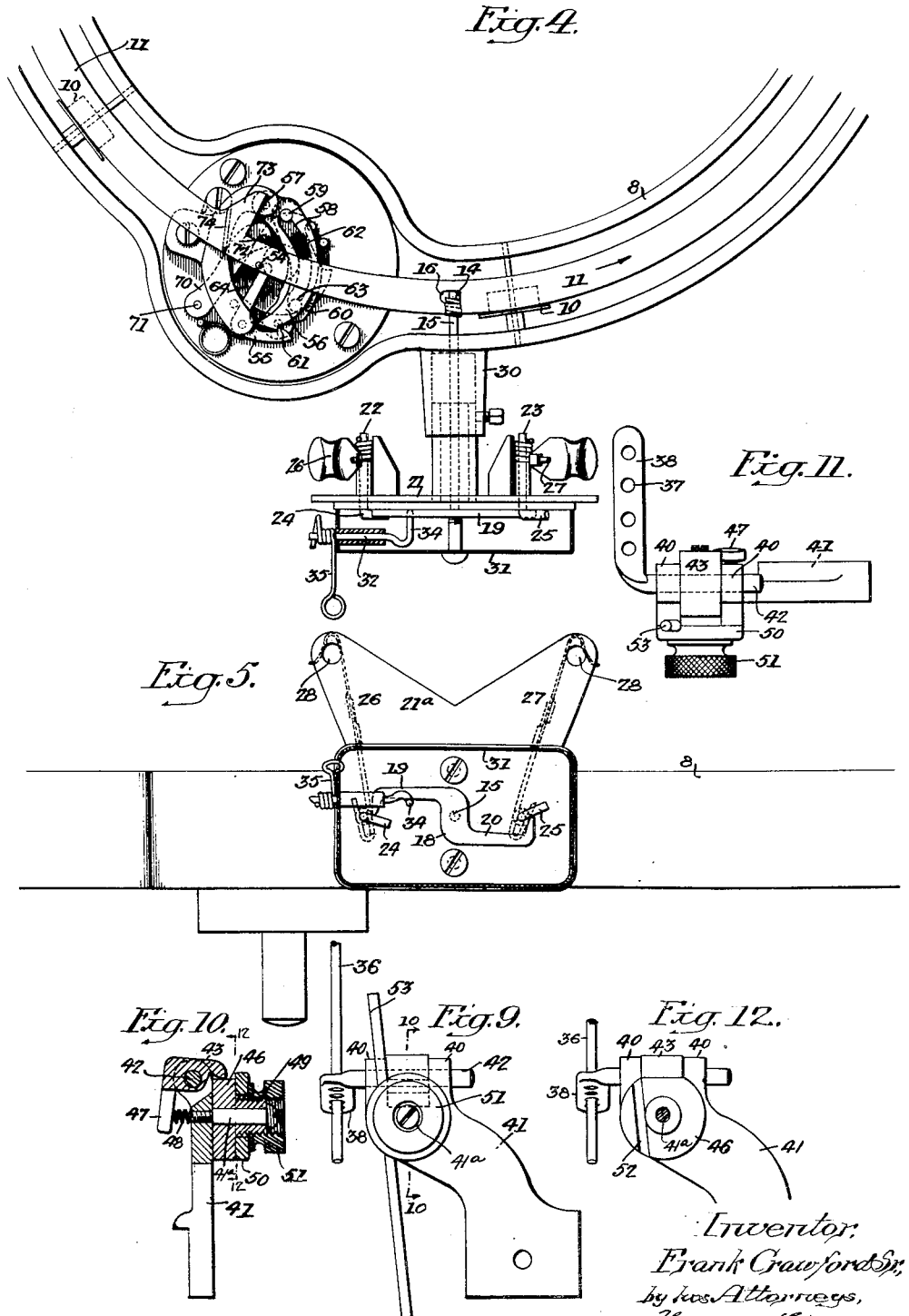

F. CRAWFORD, Sr.
STOP MOTION.
APPLICATION FILED JAN. 22, 1919.
1,354,379.
Patented Sept. 28, 1920.
5 SHEETS—SHEET 4.
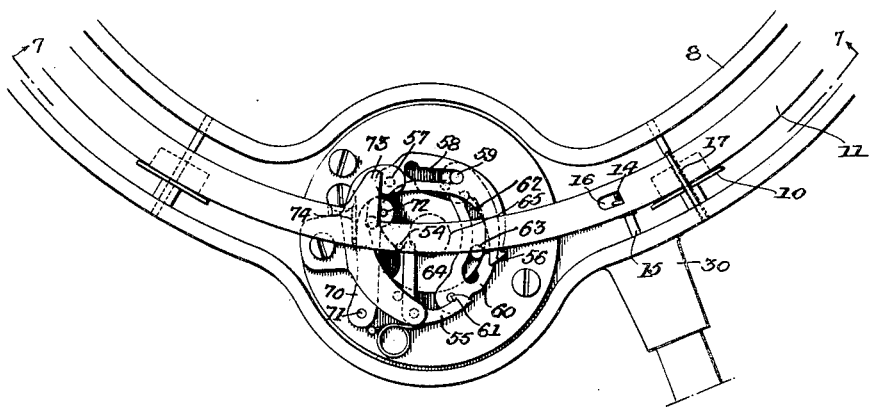
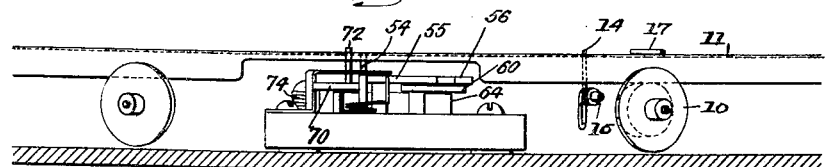
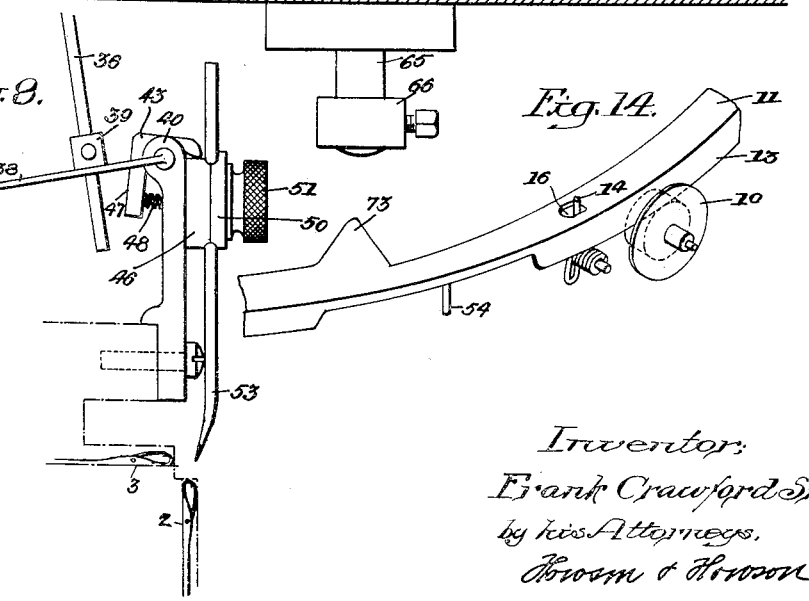
Inventor:
Frank Crawford Sr.
by his Attorneys.
Howson & Howson F. CRAWFORD, Sr.
STOP MOTION.
APPLICATION FILED JAN. 22, 1919.
1,354,379. Patented Sept. 28, 1920.
5 SHEETS—SHEET 5.
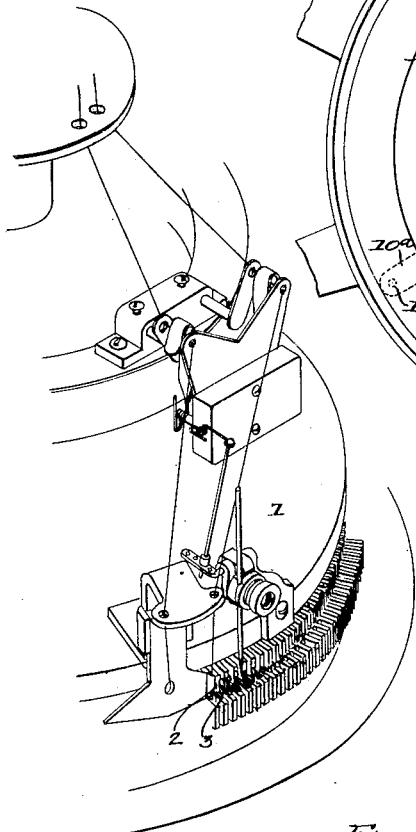
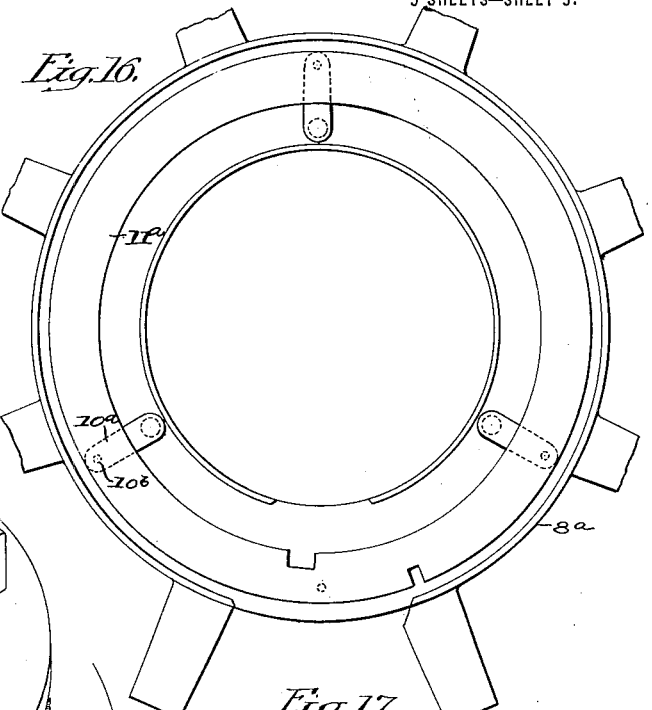
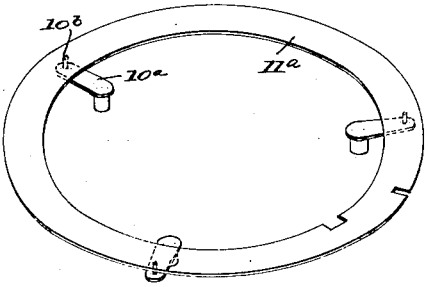
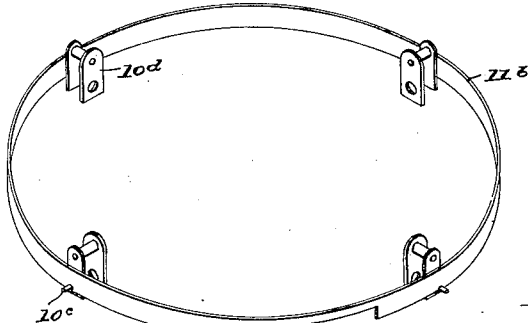
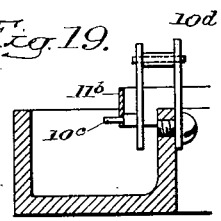

UNITED STATES PATENT OFFICE.

FRANK CRAWFORD, SR., OF NEW BRUNSWICK, NEW JERSEY, ASSIGNOR TO THE CRAWFORD MANUFACTURING COMPANY, OF NEW BRUNSWICK, NEW JERSEY, A CORPORATION OF NEW JERSEY.

STOP-MOTION.

1,354,379.

Specification of Letters Patent.

Patented Sept. 28, 1920.

Application filed January 22, 1919. Serial No. 272,536.

*To all whom it may concern:*

Be it known that I, FRANK CRAWFORD, Sr., a citizen of the United States, and a resident of New Brunswick, county of Middlesex, State of New Jersey, have invented certain Improvements in Stop-Motions, of which the following is a specification.

One object of my invention is to construct a stop motion for a knitting machine, which will automatically stop the mechanism when the thread is broken or becomes entangled, particularly at the needles, or when any one of the needles is bent or out of place.

A further object of the invention is to provide a stop motion of the above type, which is simple in construction and by which a series of detectors can be used with one release mechanism.

The invention also relates to certain details which will be fully described hereinafter.

In the accompanying drawings:

Fig. 3 is a plan view of the ring, which is mounted above the knitting machine head, and which contains the stop mechanism;

Fig. 4 is a plan view of a portion of the ring, showing the stop mechanism more in detail;

Fig. 5 is a side view of the ring with the cap plate removed;

Fig. 6 is a view similar to Fig. 4, showing the mechanism released;

Fig. 7 is a sectional view on the line 7—7, Fig. 6;

Fig. 8 is an enlarged side view, showing the location of the needle detector in relation to the needles;

Fig. 9 is a face view of a portion of the needle detector;

Fig. 10 is a sectional view on the line 10—10, Fig. 9;

Fig. 11 is a plan view of the needle detector;

Fig. 12 is a sectional view on the line 12—12, Fig. 10;

Fig. 13 is a view, showing the several elements of the needle detector detached;

Fig. 14 is a detached perspective view illustrating a portion of the ring and its flanged wheel support;

Fig. 15 is a diagrammatic view illustrating the arrangement of the threads and the location of the needle detector in relation to the needles;

Fig. 16 is a plan view illustrating a modification of the supports for the ring;

Fig. 17 is a detached perspective view of the ring illustrated in Fig. 16;

Fig. 18 is a perspective view illustrating another method of suspending a ring; and Fig. 19 is a sectional view showing one of the supports and the casing in which the ring is mounted.

Figure 1:
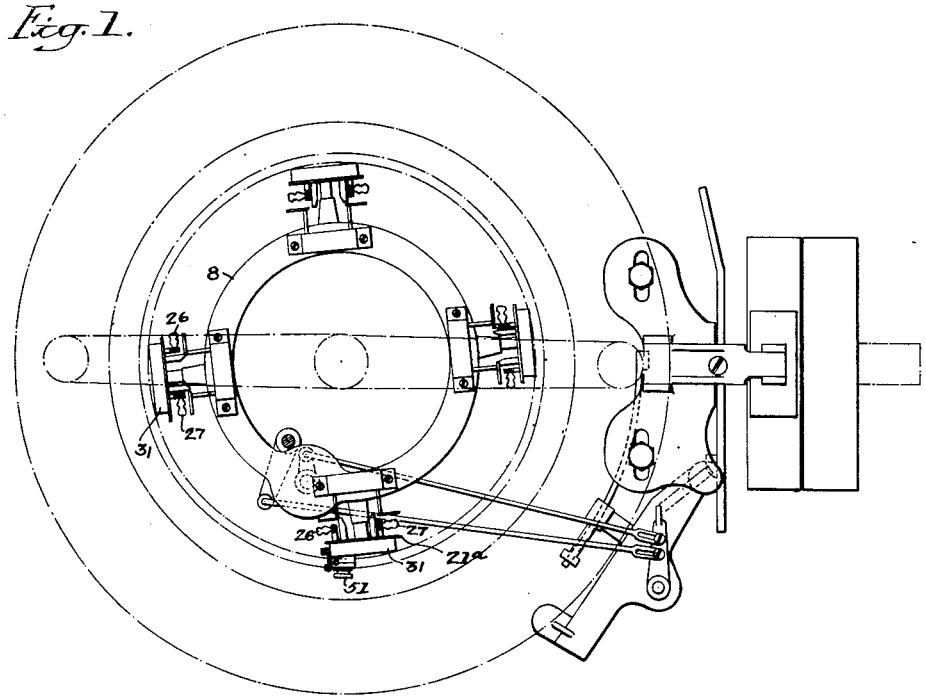
Figure 1 is a plan view, showing the knitting machine in outline and illustrating my improvement.
Figure 2:
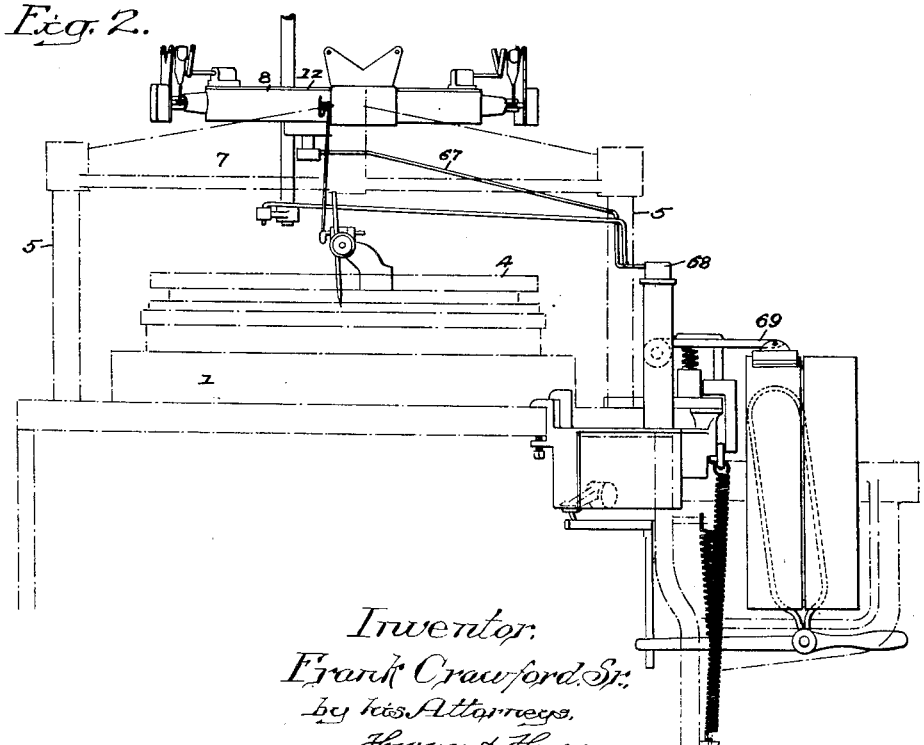
Fig. 2 is a side view.

Stop motions have been provided for stopping a machine in the event of a thread breaking, or knotting, in its passage from the bobbins to the needles. In some instances, the thread breaks, or becomes tangled, directly at the needles and then again the needles come out of line, or are accidentally bent, and this is liable to make imperfections in the fabric.

The present invention relates particularly to the stop motion for stopping the machine when a thread breaks, or becomes tangled at the needles, or when the needles themselves become out of line.

Referring to the drawings, 1 is the head of a knitting machine having a series of vertical needles 2 and dial needles 3. 4 is part of the head. 5, 5 are standards on which is mounted the spider 7 carrying the upper mechanism of the machine. 8 is a cylindrical casing secured to the spider by screws, or bolts 9, or any other suitable fastenings. Within this casing is a series of flanged rollers 10, in the present instance, which support a ring forming a portion of the stop motion. The rollers are flanged on one side, as shown, and tend to hold the ring centrally in the casing, but allowing it to turn in the casing. 12 is a cap mounted on the casing.

In order to reduce the bearing of the ring on the casing, I preferably make the ring with a deep flange 13, which bears upon the roller, as clearly shown in Fig. 14. This materially reduces the friction and makes the action very delicate. The ring is moved circumferentially by an arm 14 and by one or more spindles 15. The arm, in the present instance, projects through an opening 16 in the ring. The number of the spindles 15 depends upon the threads in the machine.

In the present instance, there are two threads to each spindle and there are four spindles.

In order to hold the rings onto the rollers, I locate the pins 17 at two or more points in the casing, which extends over the ring and prevents it from jumping when actuated by the mechanism. On the outer end of each spindle 15 is a hub 18 having two arms 19 and 20. The arm 19 is turned down, while the arm 20 is turned up. Mounted in bearings in a plate 21 are two spindles 22 and 23, bent at their outer ends to form arms 24 and 25 respectively. The arm 24 engages the arm 19 and the arm 25 engages the arm 20. Mounted on each spindle 22 and 23 are arms 26 and 27 respectively, which are hooked at their outer ends and are in line with their openings 28 in extensions 21ᵃ of the plate 21. Directly back of the thread openings in the extensions 21ᵃ are thread openings in the arms 29, adjustably mounted on the projection 30 formed integral with the casing 8. The threads hold the arms 26 and 27 in the raised position when the knitting machine is working correctly, but should a thread break, then the arms will fall and will turn the hub 18 and, with it, the spindle 15, and will move the ring 11 so as to release the latch mechanism through which the machine is stopped. Secured to the plate 21 is a cap 31. In a bearing in this cap is a lever 32. One arm 34 of the lever rests under the arm 19 of the hub 18, while the other arm 35 of the lever carries a rod 36 which extends down and through one of the openings 37 in a lever 38, Figs. 11 and 13. The lever 32 can be arranged on either side of the plate and may be duplicated when two needle detectors are desirable. On the rod is an adjustable collar 39, which rests upon the lever 38, so that when the lever drops, due to the action of the needle stop motion mechanism, the lever 32 will turn the head 18 and its spindle 15, causing the stop motion to be actuated. The lever 38 is mounted in bearings 40 on a bracket 41 secured, in the present instance, to the part 4 of the head. On the stem 42 of this lever is an adjustable arm 43 having a reduced portion 44, which bears upon a flat surface 45 of a disk 46, loosely mounted on a screw stud 41ᵃ projecting from the bracket 41. At the rear of the arm 43 is a projection 47 and between this projection and the bracket 41 is a spring 48, tending to press the reduced portion 44 of the arm down onto the flat portion 45 of the disk 46. The disk 46 has a screw threaded stem 49 on which is loosely mounted a clamping disk 50, which is secured to the disk 46 by a nut 51 having a thread adapted to the thread on the stem 49. The disk 46 has a groove 52 and the disk 50 has a groove 52ᵃ. Adapted to these grooves is a detector 53 so that when the parts are assembled, as in Fig. 8, the detector is held firmly between the disks after it has been adjusted and the detector is adjusted to a position so as to be engaged by a thread on the needles 2 and 3, or to be engaged by the needles themselves, if any one of the needles is out of alinement to such an extent that it would interfere with the perfect knitting of the goods. The moment the detector is turned it will turn the lever 38, which will cause the weighted rod 36 to drop. This rod, being connected to the arm 35, will elevate the arm 19 of the hub 18 and through the mechanism will release the stop mechanism of the machine. In some instances, the rod and the collar can be so arranged as to pull the lever down instead of pushing, as shown.

I will now proceed to describe the release mechanism of the stop motion through which the ring 11 actuates the mechanism which stops the rotation of the machine. On the ring 11 is a pin 54, which engages one arm of the trigger 55, Fig. 4. The other arm of the lever is hooked and is arranged to engage a hooked arm 56, which is pivoted at 57, and has a slot 58 in which travels a pin 59 on an arm 60 pivoted at 61. This lever has a slot 62 into which extends a pin 63 on a disk 64 mounted on a shaft 65, which has at its lower end an arm 66 to which is attached a rod 67 which connects the arm with an arm 68 on the brake release and shifting mechanism 69, which may be of any ordinary construction. The present form is fully set forth and claimed in a co-pending application filed by me on the 22nd day of January, 1919, Serial No. 272,537.

In order to return the ring 11 to its original position after its pin 54 has tripped the lever 55, I provide an arm 70 pivoted at 71 with a pin 72, which comes in contact with an abutment 73 on the ring 11. A spring 74 tends to move the arm 70 in one direction, while the cam-shaped disk 64 moves it in the opposite direction. By this arrangement, as soon as the pin 54, on the ring 11, releases the latch 55 the disk 64 forces the arm 70 back and the pin 72, of this arm, engages the abutment 73 on the ring 11, returning it to its normal position. The ring simultaneously turns all of the spindles 15, and their hubs 18, to the normal position ready to be again actuated in the event of a thread breaking, or a needle coming out of alinement. The above movement also returns the hooked levers to their normal position ready for threading.

By the above description, it will be seen that there is a single trip mechanism for actuating the means for stopping the rotation of the knitting machine, there being a ring which actuates the mechanism. This ring is arranged so that a series of threads controlling the different spindles can actuate the mechanism through this ring. Thus, each spindle has mechanism which is released when a thread breaks near the needles and other mechanism which is released should a thread become entangled at the needles, or the needles themselves become out of place.

While I have shown, in Fig. 7, the ring 11 supported on flanged wheels 10, in some instances, the ring may be supported in the manner illustrated in Figs. 16 and 17, in which 11ª is the ring and 10ª is a series of arms pivoted to the casing 8ª and having pins 10ᵇ arranged to enter notches in the under side of the ring 11ª, so that they will be free to move circumferentially a given distance, the object being to provide a support which will have the least possible resistance.

In Figs. 18 and 19, I have shown another modification in which the ring instead of being flat is arranged on edge, the ring being indicated at 11ᵇ, the ring resting on pins 10ᶜ projecting from the pivoted hangers 10ᵈ pivoted to the casing as illustrated in Fig. 19. This vertical ring is arranged to engage the trip mechanism in any suitable manner.

It will be seen that any suitable support, which will have a minimum of friction, can be used to carry the ring so that it will be delicate enough to be actuated in case of a thread breaking, or the needles becoming out of alinement.

I claim:

1. The combination in stop motions for knitting machines, of a casing; a ring mounted in the casing; means for supporting the ring; trip mechanism connected to the mechanism for stopping the machine; a series of spindles, each spindle engaging the ring; and means supported by a thread so arranged that when a thread breaks the thread-supporting means will actuate the ring and the trip mechanism through a spindle.

2. The combination in a stop motion for a knitting machine, of a casing mounted on the machine; a ring supported in the casing; trip mechanism arranged to be actuated by the ring; a series of spindles, each having an arm engaging the ring, the outer end of the spindle having a hub provided with an arm; a release lever held by the thread so that when the thread breaks the lever will fall and will cause the ring to actuate the trip mechanism to stop the machine.

3. The combination in a stop motion for knitting machines, of a trip mechanism; mechanism actuated by the trip mechanism for stopping the machine; a ring for releasing the trip mechanism; a spindle having an arm engaging the ring; a detector pivotally mounted at the needles; and means connecting the detector with the spindle so that when the detector is moved it will move the ring and release the trip mechanism, stopping the machine.

4. The combination in a stop motion, of a bracket adapted to be secured to a knitting machine directly above the needles; two clamp disks loosely mounted on a spindle projecting from a bracket; a detector clamped between the disks and extending to a point near the needles; a lever actuated by one of said disks; a rod resting upon one arm of the lever; trip mechanism actuated by the rod; and stop mechanism connected to the trip mechanism.

5. The combination in a stop motion for knitting machines, of a bracket adapted to be secured to the machine directly above the needles, said bracket having a stud; a clamp disk mounted on the stud; a detector secured to the clamp disk and extending in close proximity to the needles, the clamp disk having a flat portion; a lever having an arm bearing upon the flat portion and having another arm perforated; a rod extending through the perforations in said arm and having a collar; trip mechanism; a spindle for actuating the trip mechanism, said spindle having a hub provided with an arm; a lever having one arm engaging the arm of the hub, the rod extending through the other arm so that when the detector is moved the rod will fall and will release the trip mechanism; and means connecting the trip mechanism with the stop motion of the machine.

6. A detecting device for stop motions of knitting machines consisting of a bracket having a stud; two clamp disks mounted on the stud; a detector located between the clamp disks and adjusted in close proximity to the needles of the machine, one of said disks being made eccentric; a lever pivotally mounted in the bracket and having an adjustable arm bearing upon the eccentric portion of the disk; a spring tending to force the arm onto the disk, said lever having a perforated arm for the reception of a rod connecting the mechanism with the trip mechanism of the stop motion so that when the detector rod is moved the arm of its lever will fall and will release the trip mechanism.

7. The combination in a stop motion for knitting machines, of stop mechanism; a trip mechanism connected to the stop mechanism; a ring having means for actuating the trip mechanism; a spindle having an arm engaging the ring and having a hub provided with an arm; a hooked arm having a portion arranged to engage the arm on the hub; thread guides between which the hooked arm is mounted, said arm being held in its raised position under normal conditions.

8. The combination in a stop motion for knitting machines, of stop mechanism; a trip mechanism connected to the stop mechanism; a ring having means for actuating the trip mechanism; a spindle having an arm engaging the ring and having a hub provided with an arm; a hooked arm having a portion arranged to engage the arm on the hub; thread guides between which the hooked arm is mounted, said arm being held in its raised position under normal conditions; a needle detector; and a lever actuated by the needle detector and also engaging the arm of the hub.

9. The combination of a knitting machine having stop mechanism; an annular casing mounted on the frame of the knitting machine; trip mechanism in the casing; a ring mounted within the casing; rollers for supporting said ring, the ring having means for engaging and releasing the trip mechanism; one or more spindles engaging the ring; and means for turning the spindles when a thread breaks.

10. The combination of a knitting machine having a stop motion; an annular casing mounted on the frame of the machine; trip mechanism mounted in said casing and connected to the stop mechanism of the machine; a ring mounted in the casing and having a pin for actuating the trip mechanism; a lever for returning the ring to its normal position after the trip mechanism has been actuated; and mechanism for turning the ring, actuated when a thread breaks or becomes knotted.

11. The combination of a knitting machine having stop mechanism; an annular casing mounted on the frame of the knitting machine; trip mechanism mounted in the casing arranged to release the stop mechanism of the knitting machine; a ring mounted in the casing and having a pin for releasing the trip mechanism when the ring is moved in one direction and means for returning the ring immediately to its normal position; a spindle having an arm engaging the ring and having a hub with two arms; two pivoted arms having hooks at their outer ends and guides for the thread between which the arms are located so that the arms are normally held by the threads, the arms having extensions arranged to bear upon the arms of the hub of the spindle when one of the arms falls, due to the breaking of a thread.

12. The combination of a knitting machine having stop mechanism; trip mechanism for releasing the stop mechanism; means for actuating the trip mechanism; an arm located near the needles and held in its normal position by the thread so that, when a thread breaks and the arm falls, it will release the trip mechanism; a weighted rod connected to a lever for actuating the same trip mechanism; a detector; and a lever connected to the detector for holding the weighted rod in its raised position so that on the movement of the detector, due to an imperfection, the trip mechanism will be released.

In witness whereof I affix my signature.

FRANK CRAWFORD, Sr.